United States Patent
Ishimaru et al.

(10) Patent No.: US 11,298,927 B2
(45) Date of Patent: *Apr. 12, 2022

(54) WHITE POLYESTER FILM, LAMINATE, AND PACKAGING BAG

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/320,475

(22) PCT Filed: Jul. 24, 2017

(86) PCT No.: PCT/JP2017/026608
§ 371 (c)(1),
(2) Date: Jan. 24, 2019

(87) PCT Pub. No.: WO2018/021211
PCT Pub. Date: Feb. 1, 2018

(65) Prior Publication Data
US 2020/0023626 A1    Jan. 23, 2020

(30) Foreign Application Priority Data
Jul. 27, 2016 (JP) .............. JP2016-147256

(51) Int. Cl.
*B32B 27/36* (2006.01)
*B65D 65/40* (2006.01)

(52) U.S. Cl.
CPC .............. *B32B 27/36* (2013.01); *B65D 65/40* (2013.01); *B32B 2307/31* (2013.01);
(Continued)

(58) Field of Classification Search
CPC ............... B32B 27/36; B32B 2367/00; B32B 2307/31; C08L 67/00–03; Y10T 428/2817; Y10T 428/2826
See application file for complete search history.

(56) References Cited

U.S. PATENT DOCUMENTS 5,458,965 A * 10/1995 Yoshinaka ................ B32B 7/12
428/323
5,656,222 A * 8/1997 Berry ...................... B32B 27/20
264/131
(Continued)

FOREIGN PATENT DOCUMENTS

EP    2062726 A1 * 5/2009  ........... B32B 27/325
EP    1902839 B1 * 11/2011  ............. B32B 27/20
(Continued)

OTHER PUBLICATIONS

Machine translation of EP 1902839 B1, obtained from EspaceNet (Year: 2020).*
(Continued)

*Primary Examiner* — Z. Jim Yang
(74) *Attorney, Agent, or Firm* — Leydig, Voit & Mayer, Ltd.

(57) ABSTRACT

The invention provides a white polyester film formed with a polyester resin whose main constituent is ethylene terephthalate, and (1) the film has at least two or more layers, and has at least one white layer and at least one heat sealing layer, wherein at least one of the film surfaces is the heat sealing layer, and the film satisfies the prescribed requirements of (2) the peeling strength of the heat sealing layers, (3) the difference in reversing heat capacity between at a lower and a higher temperature than a glass transition temperature of the heat sealing layer, (4) the heat shrinkage in both a longitudinal and width direction when treated in (Continued)

hot water at 80° C. for 10 seconds, (5) the total light transmittance, and (6) the apparent specific gravity.

17 Claims, 1 Drawing Sheet

(52) U.S. Cl.
CPC ..... *B32B 2307/402* (2013.01); *B32B 2307/72* (2013.01); *B32B 2553/00* (2013.01)

(56) References Cited

U.S. PATENT DOCUMENTS

| | | | |
|---|---|---|---|
| 5,972,445 A * | 10/1999 | Kimura | B32B 27/06 428/212 |
| 10,035,335 B2 | 7/2018 | Haruta et al. | |
| 10,392,485 B2 | 8/2019 | Ishimaru et al. | |
| 2003/0049472 A1* | 3/2003 | Murschall | B32B 27/36 428/480 |
| 2005/0100718 A1* | 5/2005 | Peiffer | B32B 27/20 428/200 |
| 2005/0173050 A1* | 8/2005 | Peiffer | B32B 27/08 156/244.11 |
| 2006/0275593 A1* | 12/2006 | Kern | B32B 27/20 428/220 |
| 2008/0107880 A1* | 5/2008 | Kliesch | B32B 27/20 428/212 |
| 2008/0260917 A1* | 10/2008 | Sankey | B65D 33/01 426/114 |
| 2010/0003377 A1* | 1/2010 | Brennan | B32B 7/06 426/106 |
| 2010/0068355 A1* | 3/2010 | Berry | B32B 27/18 426/125 |
| 2010/0112250 A1* | 5/2010 | Shelby | C09J 167/02 428/35.7 |
| 2010/0119742 A1* | 5/2010 | Jesberger | B32B 27/08 428/34.8 |
| 2011/0171464 A1* | 7/2011 | Konrad | B32B 27/08 428/336 |
| 2012/0100363 A1 | 4/2012 | Yamamoto et al. | |
| 2013/0008821 A1 | 1/2013 | Haruta et al. | |
| 2013/0236612 A1* | 9/2013 | Deng | B32B 1/02 426/129 |
| 2014/0065431 A1* | 3/2014 | Sakellarides | B32B 27/36 428/446 |
| 2015/0104631 A1* | 4/2015 | Schrauf | B32B 27/08 428/220 |
| 2015/0259484 A1* | 9/2015 | Nakano | C08J 5/18 521/48 |
| 2015/0275032 A1* | 10/2015 | Deak | C08J 7/052 428/195.1 |
| 2016/0108171 A1* | 4/2016 | Haruta | C08G 63/183 428/35.2 |
| 2017/0021601 A1 | 1/2017 | Haruta et al. | |
| 2017/0321024 A1* | 11/2017 | Roberto | B32B 27/36 |
| 2017/0341355 A1* | 11/2017 | Peiffer | B32B 27/36 |
| 2018/0079877 A1 | 3/2018 | Ishimaru et al. | |
| 2018/0134019 A1* | 5/2018 | Peiffer | B32B 27/20 |
| 2018/0319539 A1 | 11/2018 | Haruta et al. | |
| 2019/0030857 A1* | 1/2019 | Fanfani | B32B 27/32 |
| 2019/0077136 A1 | 3/2019 | Ishimaru et al. | |
| 2020/0070486 A1* | 3/2020 | Ashby | B32B 7/10 |
| 2021/0101379 A1 | 4/2021 | Ishimaru et al. | |

FOREIGN PATENT DOCUMENTS

| | | |
|---|---|---|
| EP | 3127682 A1 | 2/2017 |
| JP | H07-132946 A | 5/1995 |
| JP | 3314816 B2 | 8/2002 |
| JP | 2002-256116 A | 9/2002 |
| JP | 5259897 B2 | 8/2013 |
| JP | 2015-199337 A1 | 11/2015 |
| JP | 2015-199909 A | 11/2015 |
| JP | 2017-007726 A | 1/2017 |
| KR | 10-2012-0036951 A | 4/2012 |
| WO | WO 2014/175313 A1 | 10/2014 |
| WO | 2015/151695 A1 | 10/2015 |
| WO | WO 2016/067658 A1 | 5/2016 |
| WO | 2016/152517 A1 | 9/2016 |
| WO | WO-2017164190 A1 * | 9/2017 ............. B29C 61/06 |

OTHER PUBLICATIONS

Androsch et al., "The link between rigid amorphous fraction and crystal perfection in cold-crystallized poly(ethylene terephthalate)," *Polymer*, 46(26): 12556-12566 (2005).
Lixon et al., "Evidence of Cooperative Rearranging Region size anisotropy for drawn PET," *European Polymer Journal*, 44(11): 3377-3384 (2008).
Japanese Patent Office, International Search Report in International Application No. PCT/JP2017/026608 (dated Oct. 17, 2017).
European Patent Office, Extended European Search Report in European Patent Application No. 17766582.5 (dated Nov. 8, 2019).
Japanese Patent Office, International Search Report in International Patent Application No. PCT/JP2017/009864 (dated Jun. 13, 2017).
European Patent Office, Communication Pursuant to Article 94(3) EPC in European Patent Application No. 17766582.5 (dated Mar. 9, 2021).
Korean Patent Office, Notification of Reason for Refusal in Korean Patent Application No. 10-2019-7001313 (dated Apr. 1, 2021).
China National Intellectual Property Administration, First Office Action in Chinese Patent Application No. 201780017175.5 (dated Nov. 10, 2020).
U.S. Appl. No. 16/084,834, filed Sep. 13, 2019.
Korean Intellectual Property Office, Notification of Reason for Refusal in Korean Patent Application No. 10-2018-7027498 (dated Jul. 8, 2021).
European Patent Office, Communication Pursuant to Article 94(3) EPC in European Patent Application No. 17766582.5 (dated Jan. 27, 2022).

* cited by examiner

WHITE POLYESTER FILM, LAMINATE, AND PACKAGING BAG

CROSS-REFERENCE TO RELATED APPLICATIONS

This patent application is the U.S. national phase of International Patent Application No. PCT/JP2017/026608, filed Jul. 24, 2017, which claims the benefit of Japanese Patent Application No. 2016-147256, filed on Jul. 27, 2016, which are incorporated by reference in their entireties herein.

TECHNICAL FIELD

The present invention relates to a white polyester film which is excellent in heat sealing strength, and a laminate and a packaging bag including the same.

BACKGROUND ART

Conventionally, sealant films are used as packaging materials for many of articles on the market represented by foods, pharmaceuticals and industrial products. The innermost layer of a packaging material constituting a packaging bag, a lid member or the like, is provided with a sealant layer made of a polyolefin resin such as polyethylene and polypropylene, an ionomer, or a copolymer resin such as EMMA which exhibits high sealing strength. These resins are known to be capable of achieving high adhesion strength through heat sealing.

However, an undrawn sealant film made of a polyolefin resin as described in Patent Document 1 easily adsorbs a component made of organic compounds such as fat or oil and flavor material, and accordingly, a packaging material using a sealant film as the innermost layer, namely, a layer to be brought into contact with a content, has a disadvantage that the aroma or taste of the content is easily changed. In a case where a sealant layer made of a polyolefin resin is used as the innermost layer of a packaging bag for a chemical product, a pharmaceutical, a food, or the like, it is necessary to take such a measure to include a larger amount of active ingredient of a content beforehand, and thus, a sealant layer made of a polyolefin resin is not suitable for the use, in many cases.

On the other hand, a sealant film made of an acrylonitrile resin as described in Patent Document 2 has a feature of being less liable to adsorb an organic compound contained in a chemical product, a pharmaceutical, a food or the like. However, an acrylonitrile film sometimes fails to obtain good sealing strength.

In view of such problems, Patent Document 3 discloses a polyester film for sealant use with non-adsorptivity against organic compounds. However, there has been a problem, for example, that when the film of Example 1 of Patent Document 3 is used as a sealant and left in a high-temperature environment such as a vehicle in mid-summer (about 80° C.), the sealant shrinks and an original shape cannot be maintained.

Furthermore, since the films of Patent Documents 1 to 3 is transparent, they are often unsuitable for packaging articles that change in quality because of ultraviolet light. On top of that, since the polyester films of Patent Documents 1 to 3 are as heavy as the specific gravity of 1.04, they have problems of high costs per weight. Moreover, in recent years it has been required for packaging materials not only to protect their contents but also to have high design quality, which has led to high demand for white films.

One example of white polyester films having a heat sealing layer is disclosed in Patent Document 4. The white polyester film recited in Examples of Patent Document 4 has a heat sealing strength of 1.4 N/15 mm, however, such a heat sealing strength does not satisfy existing demand standard and is of no practical use.

PRIOR ART DOCUMENT

Patent Documents

Patent Document 1: JP-5259897-B
Patent Document 2: JP-A-H7-132946
Patent Document 3: WO2014/75313
Patent Document 4: JP-3314816-B Non-Patent Documents Non-Patent Document 1: R. Androsch, B. Wunderlich, Polym., 46, 12556-12566 (2005)
Non-Patent Document 2: C. Lixon, N. Delpouve, A. Saiter, E. Dargent, Y. Grohens, Eur. Polym. J., 44, 3377-3384 (2008)

SUMMARY OF THE INVENTION

Problems to be Solved by the Invention

An object of the present invention is to solve the problems of the conventional technique. That is, a gist of the present invention is to provide a white polyester film suitable for use as a sealant, which not only has high heat sealing strength, but also is less liable to adsorb various organic compounds, and has a less shrinkage in heating and suitable for use as a sealant. The present invention also intends to provide a laminate comprising at least one layer of the white polyester film suitable for use as a sealant, and a packaging bag including the same.

Means for Solving the Problems

The present invention has the following constitution. 1. A polyester film which is formed with a polyester resin whose main constituent is ethylene terephthalate, and satisfies the following requirements (1) to (6):

(1) the film comprises at least two or more layers, and comprises at least one white layer and at least one heat sealing layer, wherein at least one of the film surfaces is the heat sealing layer;

(2) the film has a peeling strength of 4 N/15 mm or more and 25 N/15 mm or less when the heat sealing layers of the polyester film are heat-sealed to each other at 160° C. and 0.2 MPa for 2 seconds;

(3) the heat sealing layer of the polyester film has a difference in reversing heat capacity of 0.18 J/g·K or more and 0.35 J/g·K or less, and wherein the difference in reversing heat capacity is measured between at a lower and a higher temperature than a glass transition temperature with a temperature modulated DSC;

(4) the film has a heat shrinkage of −10% or more and 10% or less both in a longitudinal direction and in a width direction when treated in hot water at 80° C. for 10 seconds;

(5) the film has a total light transmittance of 20% or more and 40% or less; and (6) the film has an apparent specific gravity of 0.90 or more and 1.30 or less.

2. The white polyester film according to above 1, wherein a polyester component constituting the polyester film comprises at least one selected from the group consisting of neopentyl glycol, 1,4-cyclohexanedimethanol, isophthalic acid, and diethylene glycol.

3. The white polyester film according to above 1 or 2, wherein a polyester component constituting the polyester film comprises 1,4-butanediol.

4. The white polyester film according to any one of above 1 to 3, having a film thickness of 5 to 200 μm.

5. A packaging bag including at least one of the white polyester film according to any one of above 1 to 4.

6. A laminate comprising at least one layer of the white polyester film according to any one of above 1 to 4.

7. A packaging bag including at least one of the laminate according to above 6.

Effects of the Invention

The white polyester film of the present invention not only exhibits high heat sealing strength, but also is less liable to adsorb various organic compounds, and therefore, is capable of hygienically packaging an article which contains oil or a flavor material, such as a chemical product, a pharmaceutical, and a food. In addition, the film has a small shrinkage when heated, and therefore, has a small shrinkage even in a high temperature environment. In addition, even when the white polyester film is processed, problem such as breakage is less liable to occur. The present invention is further capable of providing a laminate comprising at least one layer of the white polyester film, and a packaging bag including the same.

MODE FOR CARRYING OUT THE INVENTION

A white polyester film of the present invention is formed with a polyester resin whose main constituent is ethylene terephthalate, and satisfies the following requirements (1) to (6):

(1) the film comprises at least two or more layers, and comprises at least one white layer and at least one heat sealing layer, wherein at least one of the film surfaces is the heat sealing layer; (2) the film has a peeling strength of 4 N/15 mm or more and 25 N/15 mm or less when the heat sealing layers of the polyester film are heat-sealed to each other at 160° C. and 0.2 MPa for 2 seconds;

(3) the heat sealing layer of the polyester film has a difference in reversing heat capacity of 0.18 J/g·K or more and 0.35 J/g·K or less, and wherein the difference in reversing heat capacity is measured between at a lower and a higher temperature than a glass transition temperature with a temperature modulated DSC;

(4) the film has a heat shrinkage of −10% or more and 10% or less both in a longitudinal direction and in a width direction when treated in hot water at 80° C. for 10 seconds;

(5) the film has a total light transmittance of 20% or more and 40% or less; and (6) the film has an apparent specific gravity of 0.90 or more and 1.30 or less.

The white polyester film of the present invention which satisfies the above requirements is a white polyester film excellent in a heat sealing property, and suitable for use as a sealant. Since the film is less liable to adsorb various organic compounds, it is also possible to provide a sealant material suitable to a packaging bag. Further, since the film has a small shrinkage when heated, it is possible to maintain a shape of the film, even in a high temperature environment. In addition, the polyester film of the present invention has a good processability, for its high tensile strength.

In particular, since each of the heat sealing property and the low shrinkage; and each of the heat sealing property and the high tensile strength, are both properties antinomic to each other, there has conventionally been no polyester film which can satisfy all of these properties. Hereinbelow, the polyester film of the present invention is described.

1. Layer Structure of the Polyester Film

A white polyester film of the present invention needs to have at least two or more layers, and needs to have at least one white layer and at least one heat sealing layer; and the heat sealing layer needs to be located on at least one surface of the white polyester film. The white layer can be located on both the surface and an inner layer (central part) of the film, however, it is preferable that the white layer is designed to be an inner layer. As mentioned later, it is preferable that inorganic or organic additives are mixed into the white layer such that the film develops features as a light shield. Since such additives inhibit heat sealing, required heat sealing strength cannot be obtained if the white layer is located on the both surfaces of the film. In addition, in a case where the white layer contains cavities, the white layer located on the surface of the film causes rougher surface of the film to diminish printing performance. The preferable laminated constitution of the film is two kinds and three layers constitution that is "heat sealing layer/white layer/heat sealing layer." The two kinds and three layers constitution is preferable because it ensures not only heat sealing strength of the film but also smoothness of the both surfaces of the film.

A thickness ratio of the heat sealing layer to the whole film is determined by a difference in reversing heat capacity of the heat sealing layer to be described later. From a viewpoint of developing heat sealing strength of the film, the thickness ratio of the heat sealing layer to the whole film is preferably 20% or more and 80% or less, more preferably 25% or more and 75% or less, and still more preferably 30% or more and 70% or less. The thickness ratio of the heat sealing layer to the whole film of 20% or less is not preferable because it becomes difficult for the heat sealing strength to be 4 N/15 mm or more. On the other hand, the thickness ratio of the heat sealing layer to the whole film of 80% or more is not preferable because the thickness ratio of the white layer decreases to degrade shielding property even though the heat sealing strength improves.

A thickness ratio of the white layer to the whole film is determined by an additive amount of thermoplastic resin immiscible with polyester contained in the white layer and an additive amount of inorganic particles. From a viewpoint of shielding property and maintaining strength of the film, the thickness ratio of the white layer to the whole film is preferably 20% or more and 80% or less, more preferably 25% or more and 75% or less, and still more preferably 30% or more and 70% or less. In a case where the thickness ratio of the white layer to the whole film of less than 20%, the shielding property of the film is degraded. To make up such a degradation, if the amount of thermoplastic resin immiscible with polyester and the amount of inorganic particles that need to be mixed into the white layer are increased, it is not preferable because the film forming becomes difficult. On the other hand, the thickness ratio of the white layer to the whole film of more than 80% is no preferable because the thickness of the heat sealing layer decreases relatively to reduce the heat sealing strength.

In laminating the film, it is possible to use a publicly-known method such as: a co-extrusion by a multi-manifold T die or an inflation method; adhesion by a wet or dry lamination or a hot melt; etc.

From a viewpoint of strength, the heat sealing layer and the white layer are preferably drawn at least in one direction (uniaxial drawing), and a biaxial drawing is more preferred, although any of undrawing, uniaxial drawing, and biaxial drawing may be used. Raw materials of each layer and a suitable manufacturing method in the case of biaxial drawing will be described later.

It is further possible, in the white polyester film of the present invention, to provide a layer processed by corona treatment, coating treatment, flame treatment or the like, in order to improve an adhesive property of a film surface irrespective of the heat sealing layer or white layer. Such a layer may be provided arbitrarily within a range not departing from requirements of the present invention.

2. Types of the Polyester Raw Materials Constituting the Heat Sealing Layer

The polyester of the heat sealing layer contained in the white polyester film of the present invention (hereinbelow simply referred to as heat sealing layer) is a polyester whose main constituent component is ethylene terephthalate unit.

In addition, it is preferred that the polyester of the heat sealing layer contains one or more monomer components which can be amorphous components (hereinbelow simply referred to as amorphous component). This is because presence of an amorphous component makes a difference in reversing heat capacity, which will be described later, less liable to lower, even during a film forming process such as drawing or heat setting, and heat sealing strength is improved.

Examples of monomer of carboxylic acid component which can be an amorphous component may include isophthalic acid, 1,4-cyclohexaneclicarboxylic acid, and 2,6-naphthalenedicarboxylic acid.

Further, examples of monomer of a diol component which can be an amorphous component may include neopentyl glycol, 1,4-cyclohexanedimethanol, diethylene glycol, 2,2-diethyl 1,3-propanediol, 2-n-butyl-2-ethyl-1,3-prop anediol, 2,2-isopropyl-1,3-prop anediol, 2,2-di-n-butyl-1,3-propanediol, and hexanediol.

Among these amorphous carboxylic acid components and diol components, it is preferred to include at least one of isophthalic acid, neopentyl glycol, 1,4-cyclohexanedimethanol, and diethylene glycol. It is more preferred to include at least one of neopentyl glycol, 1,4-cyclohyxanedimethanol, and diethylene glycol, still preferably at least one of neopentyl glycol and 1,4-cyclohyxaneclimethanol, and most preferably neopentyl glycol.

Use of these components increases the difference in reversing heat capacity of the film, to facilitate improvement of heat sealing strength.

In the heat sealing layer, it is also possible to include a component other than ethylene terephthalate or amorphous components. Examples of dicarboxylic acid component constituting the polyester may include aromatic dicarboxylic acids such as orthophthalic acid; aliphatic dicarboxylic acids such as adipic acid, azelaic acid, sebacic acid and decanedicarboxylic acid; and alicyclic dicarboxylic acids. However, a polycarboxylic acid having three or more valences (for example, trimellitic acid, pyromellitic acid, and anhydrides thereof) is preferably not contained in the polyester.

In addition to those described above, examples of a component constituting the polyester may include long chain diols such as 1,4-butanediol, aliphatic diols such as hexanediol, and aromatic diols such as bisphenol A. Among them, 1,4-butanediol is preferably contained. The content of 1,4-butanediol is preferably 4 mol % or more and 50 mol % or less, more preferably 6 mol % or more and 45 mol % or less, and particularly preferably 8 mol % or more and 40 mol % or less. Further, as a component constituting the polyester, a polyester elastomer containing ε-caprolactone, tetramethylene glycol, or the like, may be contained. These components have not only an effect of increasing the difference in reversing heat capacity of the film, but also an effect of lowering the melting point of the film, and are therefore preferred as a component of the heat sealing layer. However, it is preferred that the polyester do not contain a diol having 8 or more carbon atoms (e.g., octanecliol, etc.), or a polyalcohol having 3 or more valences (e.g., trimethylolpropane, trimethylolethane, glycerin, diglycerin, etc.) which lowers film strength significantly.

The heat sealing layer may be added with various additives such a wax, an antioxidant, an antistatic agent, a crystal nucleating agent, a viscosity reducing agent, a thermal stabilizer, a coloring pigment, an anti-coloring agent, and an ultraviolet absorber. In addition, fine particles as a lubricant for improving smoothness of the film are preferably added to at least a surface layer of the film. As the fine particles, those of an arbitrary substance may be selected. Examples of inorganic fine particles may include those of silica, alumina, titanium dioxide, calcium carbonate, kaolin, barium sulfate, etc., and examples of organic fine particles may include those of acrylic resin particles, melamine resin particles, silicone resin particles, cross-linked polystyrene particles, etc. An average particle size of the fine particles may be appropriately selected according to needs within a range of 0.05 to 3.0 μm as measured by Coulter counter.

As a method of blending the particles in the heat sealing layer, for example, they can be added in an arbitrary step in production of the polyester resin, but they are preferably added in a step of esterification, or in a step before start of polycondensation reaction and after completion of ester exchange reaction as slurry dispersed in ethylene glycol etc., followed by carrying out polycondensation reaction. Further, the method may also include such as a method in which slurry of particles dispersed in ethylene glycol, water, other solvent or the like and raw materials of polyester resin are mixed using a kneading extruder with a vent, or a method in which dried particles and raw materials of polyester resin are mixed using a kneading extruder.

3. Types of the Polyester Raw Materials Constituting the White Layer

The white polyester film of the present invention must be provided with the white layer in addition to the heat sealing layer as described above. To provide the white layer, methods such as forming microscopic cavities in the inner part of the film or white printing (the so-called white solid printing) over the entire surface of the film can be adopted either alone or in combination. Hereinbelow, the method of forming microscopic cavities in the inner part of the film will be described.

As polyester raw materials of the white layer, the same polyester as of the heat sealing layer can be used. For example, a polyester composed of the aforementioned suitable components for the heat sealing layer can be used to provide the polyester layer which composition is different from the heat sealing layer. An amount of amorphous components in the polyester raw materials of a layer other than the heat sealing layer is preferably 25 mol % or less. In a case where the amount of amorphous components in a layer other than the heat sealing layer is more than 25 mol %, mechanical strength and heat resistance of the film become lower.

As a method for forming cavities in the inner part of the film is, for example, a foaming agent can be mixed into the film, and then the film can be extruded. As a favorable method, a polyester constituting the white layer is mixed with a thermoplastic resin immiscible with the polyester, and then the film is drawn at least uniaxially to form cavities. The kind of the thermoplastic resin immiscible with the polyester is freely selected, and not especially limited as long as the thermoplastic resin is immiscible with the polyester. Specifically, the thermoplastic resin includes polystyrene-based resin, polyolefin-based resin, polyacrylic-based resin, polycarbonate-based resin, polysulfone-based resin, and cellulose-based resin. Especially, from a viewpoint of formability of cavities, polystyrene-based resin and polyolefin-based resin such as polymethylpentene and polypropylene are preferable.

Polystyrene-based resin refers to thermoplastic resin that includes polystyrene structure as a primary compositional unit, and includes not only homopolymers such as atactic polystyrene, syndiotactic polystyrene, and isotactic polystyrene but also modified resin that is grafted or copolymerized with other components such as impact-resistant polystyrene and modified polyphenylene ether resin, and further includes thermoplastic resin that is compatible with these polystyrene resin such as a mixture with polyphenylene ether.

Polymethylpentene-based resin is polymers having units 80 mol % or more, preferably 90 mol % or more of which is derived from 4-methylpentene-1, and the other components includes derived units from ethylene unit, propylene unit, butene-1 unit, 3-methylbutene-1, or the like.

Polypropylene-based resin used in the present invention includes not only homopolymers such as isotactic polypropylene and syndiotactic polypropylene but also modified resin that is grafted or copolymerized with other components. The thermoplastic resin immiscible with polyester of the present invention is dispersed in the polyester in various forms such as spherical shape, oval spherical shape, and string shape.

Into the mixture of the thermoplastic resin immiscible with the polyester constituting the white layer, every kind of additives can be added as necessary such as kinds of wax, an antioxidant, an antistatic agent, a crystal nucleating agent, a viscosity reducing agent, a thermal stabilizer, a coloring pigment, an anti-coloring agent, and an ultraviolet absorber. In addition, fine particles as a lubricant for improving operability (smoothness) of the film and fine particles as a shielding auxiliary agent for reducing total light transmittance are preferably added. The fine particles can be freely selected, and for example, inorganic fine particles are exemplified by silica, alumina, titanium dioxide, calcium carbonate, kaolin, and barium sulfate; and organic fine particles are exemplified by acrylic-based resin particles, melamine resin particles, silicone resin particles, and cross-linked polystyrene particles. The average particle diameter of the fine particles may be appropriately selected according to needs within a range of 0.05 to 3.0 μm (when measured by Coulter counter). The particles as a lubricant preferably make up 50 ppm or more relative to the whole weight of the film, and more preferably 100 ppm or more. However, excessive amount of the lubricant may cause larger asperity of the film, and therefore, 3000 ppm or less is preferable, and more preferably 1000 ppm.

As a method for mixing the abovementioned particles into the mixture of the thermoplastic resin immiscible with the polyester constituting the white layer, for example, the particles can be added in any steps of producing polyester resin. It is preferred that the particles are formed into slurry, and the slurry is dispersed in ethylene glycol and added to the mixture in the esterification step or after the interesterification reaction before polycondensation reaction, and then the polycondensation is proceeded. In addition, the method preferably includes a method in which slurry of the particles dispersed in ethylene glycol, water, or the like and raw materials of the polyester resin is mixed by the use of a kneading extruder with a vent; and a method in which dried particles and raw materials of the polyester resin are mixed by the use of a kneading extruder.

A ratio of the immiscible resin in the white layer is preferably 0% or more and 20% or less in weight. The ratio of 0% means that no immiscible resin is contained. In this case, it is preferred that the abovementioned particles as a shielding auxiliary agent for reducing total light transmittance are added to develop shielding property. The content of the immiscible resin of 20% or more is not preferable because the content rate of the cavities becomes higher in the white layer to reduce the physical strength of the film. The content of the immiscible resin is more preferably 5% or more and 15% or less.

Furthermore, in a case where the shielding property developed by cavity forming agent (immiscible resin) such as polyolefin resin is insufficient, inorganic particles are generally used in combination such as titanium dioxide, calcium carbonate, and barium sulfate. From a viewpoint of shielding property, the content of the inorganic particles in the white layer is preferably 2 to 25% in weight. The content of the inorganic particles of less than 2% in weight is not preferable because shielding property is not sufficient. On the other hand, the content of the inorganic particles of more than 25% in weight is not preferable because film forming becomes unstable to cause frequent breakage of the film.

4. Properties of the White Polyester Film

Next, properties of the white polyester film of the present invention, required in being used as a sealant, are described.

4.1. Heat Sealing Strength

First, it is preferred that a heat sealing strength of the polyester film of the present invention is 4 N/15 mm or more and 25 N/15 mm or less when the heat sealing layers are heat-sealed to each other at a temperature of 160° C., with a seal bar pressure of 0.2 MPa, for a sealing time of 2 seconds.

If the heat sealing strength is less than 4 N/15 mm, a sealed portion is easily peeled, and the film cannot be used as a packaging bag. The heat sealing strength is preferably 5 N/15 mm or more, more preferably 6 N/15 mm or more. Although high heat sealing strength is preferred, a currently available upper limit is about 25 N/15 mm.

4.2. Difference in Reversing Heat Capacity

It is preferred that the heat sealing layer of the white polyester film has a difference in reversing heat capacity of 0.18 J/g·K or more and 0.35 J/g·K or less, and wherein the difference in reversing heat capacity is measured between at a lower and a higher temperature than a glass transition temperature (Tg) with a temperature modulated DSC.

Hereinbelow, a relationship between a concept of mobile amorphous phase and heat sealing strength is described.

Heat sealing is a technique which is worked out by softening or liquefying a heat sealing layer by heating, namely, by changing an arrangement of a polymer which is a constituent component. It is a common recognition that those cause a softening or liquefying easily with heat are amorphous components which has a weak binding of a molecular chain. Conventionally, it has been considered that a higher-order structure of a polymer constituting a film is divided into a crystalline phase and an amorphous phase, and that an amorphous phase is increased and heat sealing strength is enhanced simply by increasing an amount of an amorphous component. However, as a result of investigations by the present inventors, it has been found that, in a uniaxial drawing film or a biaxial drawing film, even if an amount of an amorphous component is simply increased, no increase in heat sealing strength corresponding to an increment amount is observed, and that the tendency is particularly remarkable in a biaxial drawing film. From these facts, it was conceived that a mobile amorphous content, which will be described below, was contributing to heat sealing strength.

It is known that an amorphous phase is further divide into rigid amorphous phase and mobile amorphous phase according to softness thereof (for example, Non-Patent Document 1). The mobile amorphous phase, which is the softest component among these three phases, is changed from a solid phase to a liquid phase with Tg as the boundary, in a process of temperature rise, to increase a heat capacity. On the other hand, in a rigid amorphous phase or a crystal phase, change from a solid phase does not occur until a melting point is reached, and accordingly, a difference in heat capacity between at a lower and a higher temperature than Tg corresponds to a mobile amorphous content. It is considered that, when a mobile amorphous content is large, a molecular chain become easy to move, namely, become easy to soften by heat, increasing an intrusion or fusing of the heat sealing layers to each other, resulting higher heat sealing strength. The inventors of the present invention have found that it is possible to secure desirable heat sealing strength by controlling a mobile amorphous content of a heat sealing layer to be within a prescribed range. If the difference in reversing heat capacity $\Delta Cp$ is less than 0.18 J/g·K, a mobile amorphous content necessary to a heat sealing layer cannot be met, and heat sealing strength falls below 4 N/15 mm. On the other hand, the higher the difference in reversing heat capacity $\Delta Cp$ of a heat sealing layer is, the more the heat sealing strength of the heat sealing layer is increased, which is preferred. However, when the $\Delta Cp$ of a heat sealing layer becomes too high, an appropriate heat sealing become difficult, since a heat resistance is lowered, and a blocking occurs at the time of heat sealing, in a periphery of a portion to be sealed (a phenomenon that a region broader than intended is sealed due to a heat conduction from a heating member). An upper limit of preferred difference in reversing heat capacity $\Delta Cp$ is 0.4 J/g·K.

4.3. Shrinkage

A hot-water heat shrinkage in the white polyester film of the present invention is −10% or more and 10% or less both in the width direction and the longitudinal direction, when treated in hot water of 80° C. for 10 seconds.

When the shrinkage exceeds 10%, a shrinkage becomes large when a film is heat-sealed, deteriorating flatness after the sealing. An upper limit of the hot-water heat shrinkage is preferably 9% or less, more preferably 8% or less. On the other hand, a hot-water heat shrinkage below zero means that a film is elongated, which is not preferred because it becomes hard to maintain an original shape of a film, similarly in the case where a shrinkage is high.

4.4. Film Thickness

A thickness of the polyester film of the present invention is preferably 3 µm or more and 200 µm or less, although not particularly limited. A film thickness thinner than 3 µm is not preferred for causing a lack of heat sealing strength or making a process such as a printing difficult. A film thickness of thicker than 200 µm may also be possible, but is not much preferred because it increases weight of the film to be used, to increase a chemical cost. The film thickness is more preferably 5 µm or more and 160 µm or less, and even more preferably 7 µm or more and 120 µm or less.

4.5. Thickness Irregularity in the Longitudinal Direction

A thickness irregularity of the white polyester film of the present invention is preferably 18% or less when a measured length is 10 m in the longitudinal direction. A value exceeding 18% of the thickness irregularity in the longitudinal direction is not preferred, because it tends to cause a printing error when the film is subjected to a printing. Incidentally, the thickness irregularity in the longitudinal direction is more preferably 16% or less, and particularly preferably 14% or less. Although the smaller the thickness irregularity in the longitudinal direction is, the more it is preferred, the lower limit thereof is considered to be about 1% at the minimum, in view of performance of a film forming apparatus.

4.6. Thickness Irregularity in the Width Direction

In the width direction, thickness irregularity is preferably 18% or less, when a measured length is 1 m. A value exceeding 18% of the thickness irregularity in the width direction is not preferred, because it tends to cause a printing error when the film is subjected to a printing. Incidentally, the thickness irregularity in the width direction is more preferably 16% or less, and particularly preferably 14% or less. Although the nearer to 0% the thickness irregularity in the width direction is, the more it is preferred, 1% is considered to be adequate for the lower limit, in view of performance of a film forming apparatus and easy producibility.

4.7. Total Light Transmittance

A total light transmittance of the white polyester film of the present invention must be 20% or more and 40% or less. In a case where the total light transmittance of the film, which is used as packaging materials, is 40% or more, packaged articles are irradiated by ultraviolet beam to deteriorate prematurely because of the film's poor shielding property. The total light transmittance of the film of less than 15% is more preferable, however, the present invention sets the lower limit at 20% because the present invention has limitations of 20%.

4.8. Apparent Specific Gravity

An apparent specific gravity of the white polyester film of the present invention must be 0.90 or more and 1.30 or less. In a case where the apparent specific gravity is 1.20 or less, the strength of the film is reduced to be liable to break. On top of that, manufacturing the film such that the apparent specific gravity is 1.20 or less causes larger amount of cavities in the white layer, and therefore the film is liable to break. On the other hand, in a case where the apparent specific gravity is 1.30 or more, the weight per film area becomes heavier to raise the cost of chemicals.

5. Manufacturing Method of the White Polyester Film 5.1. Film Forming by Co-Extrusion 5.1.1. Melt Extrusion The white polyester film of the present invention is manufactured by using the raw materials described in the above 2. "Types of the polyester raw materials constituting the heat sealing layer" and the above 3. "Types of the polyester raw materials constituting the white layer." The heat sealing layer can be manufactured by melt-extruding polyester raw materials described in the above 2. "Types of the polyester raw materials constituting the heat sealing layer" to obtain an undrawn film, as a sealant layer. However, in this case, in order to enhance the strength of the film, it is preferred that the film is laminated with the white layer drawn in at least one direction by the method listed in the above 1. "Layer structure of the polyester film". Additionally, in the present invention, the polyester film can be also obtained by melt-extruding the polyester raw materials described in each of the above 2. "Types of the polyester raw materials constituting the heat sealing layer" and the above 3. "Types of the polyester raw materials constituting the white layer" with discrete extruders respectively, and laminating the extruded materials to obtain an undrawn film, and then uniaxial drawing or biaxial drawing the undrawn film according to the prescribed method described below. In this connection, it is possible to obtain polyester so as to contain an appropriate amount of monomers which can be amorphous components as described above, by selecting kind and amount of a dicarboxylic acid component and a diol component, which are then polycondensed. It is also possible that two or more kinds of chip-shaped polyesters are mixed to be used as raw materials of the film.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into an undrawn film. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted. The film is preferably drawn in at least one direction of lengthwise (longitudinal) direction and transverse (width) direction, that is, uniaxial drawing or biaxial drawing is preferred. Below described is a sequential-biaxial drawing method performed as lengthwise drawing-transverse drawing that first performs a lengthwise drawing and next performs a transverse drawing. The method may also be performed as transverse drawing-lengthwise drawing that reverses the order, since it merely changes the direction of main orientation. It is also possible to use a simultaneous biaxial drawing method.

5.1.2. Lengthwise Drawing

The lengthwise drawing may preferably be performed by introducing an undrawn film to a lengthwise drawing machine in which a plural number of rolls are continuously disposed. In a lengthwise drawing, it is preferred that preheating be performed by a preheating roll, until a film temperature reaches 65° C. to 90° C. The film temperature lower than 65° C. makes a drawing in the lengthwise direction difficult, and accordingly, breakage tends to occur, which is not preferred. The temperature higher than 90° C. makes the film liable to stick to a roll, making the film liable to wind around a roll or making a roll liable to be contaminated from a successive production, which is not preferred.

A lengthwise drawing is conducted when the film temperature has reached 65° C. to 90° C. A lengthwise drawing ratio is preferably 1 time or more and 5 times or less. Since the 1 time means that lengthwise drawing has not been performed, the lengthwise drawing ratio should be 1 time in order to obtain a transverse uniaxial drawn film, and the lengthwise drawing should be 1.1 times or more in order to obtain a biaxial drawn film. Although an upper limit of the lengthwise drawing ratio may be any times, a too high lengthwise drawing ratio makes a transverse drawing difficult, making a breakage easily occur. Therefore, the upper limit is preferably 5 times or less.

In addition, after the lengthwise drawing, a shrinkage in the longitudinal direction of the film, caused by the lengthwise drawing, may be reduced by relaxing the film in the longitudinal direction (relaxation in the longitudinal direction). It is also possible, by the relaxation in the longitudinal direction, to reduce a bowing phenomenon (distortion) which occurs in a tenter. Since the polyester film of the present invention contains an amorphous material, a shrinking property in the longitudinal direction caused by the lengthwise drawing is considered dominant to bowing distortion. That is because, in the subsequent steps of transverse drawing or the final heat treatment, heating is performed in such a state that both ends in the film width direction are held, and therefore, only the center portion of the film shrinks in the longitudinal direction. A relaxation ratio in the longitudinal direction is preferably 0% or more and 70% or less (relaxation ratio 0% means that relaxation is not conducted). Since an upper limit of the relaxation ratio in the longitudinal direction is determined depending on materials to be used or conditions in the lengthwise drawing, it is impossible to carry out relaxation beyond the upper limit. In the polyester film of the present invention, an upper limit of the relaxation ratio in the longitudinal direction is 70%. Relaxation in the longitudinal direction may be carried out by heating the film after the lengthwise drawing at a temperature of 65° C. to 100° C., and controlling the difference in rotation speed between the rolls. As a means of the heating, it is possible to use any of a roll, a near infrared ray, a far infrared ray, a hot air heater, and the like. The relaxation in the longitudinal direction is not necessarily carried out after the lengthwise drawing, but may be carried out at an arbitrary timing. For example, it is possible to carry out the relaxation during the transverse drawing (including a preheating zone) or during the final heat treatment, by narrowing a clip interval in the longitudinal direction (in this case, both ends in the film width direction are also relaxed in the longitudinal direction, and accordingly, the bowing distortion is reduced).

After the relaxation in the longitudinal direction (in a case where the relaxation is not conducted, the lengthwise drawing), the film preferably be cooled once, and preferably be cooled on a cooling roll having a surface temperature of 20 to 40° C.

5.1.3. Transverse Drawing

It is preferred that, after the lengthwise drawing, a transverse drawing is conducted with holding both ends in the width direction of the film by clips in a tenter, at 65° C. to 110° C., at a drawing ratio of 3.5 to 5 times. It is preferred that preheating has been conducted before the transverse drawing, and that the preheating has been conducted until a surface temperature of the film reaches 75° C. to 120° C.

It is preferred that, after the transverse drawing, the film is passed through an intermediate zone in which no aggressive heating operation is carried out. The subsequent final heat treatment zone has a higher temperature against the transverse drawing zone in the tenter. Therefore, if an intermediate zone is not provided, heat of the final heat treatment zone (hot air itself or radiant heat) should flow into the transverse drawing step. In such a case, a temperature of the transverse drawing zone is not stabilized, to cause not only a deterioration in the film thickness accuracy, but also a variation in a physical property such as heat sealing strength and a shrinkage. Thus, it is preferred that the film after the transverse drawing is passed through the intermediate zone to allow a prescribed time to elapse, and thereafter, the final heating treatment is conducted. In this intermediate zone, it is important to block an associated flow that accompanies a running of a film, or hot air from the transverse drawing zone or the final heat treatment zone, such that, when a strip-shaped paper piece is suspended in the intermediate zone in a state where a film is not passed through, the paper piece hangs down almost completely in the vertical direction. For a passage time of the intermediate zone, about 1 second to 5 seconds is sufficient. If the passage time is shorter than 1 second, the length of the intermediate zone becomes insufficient, resulting in an insufficient heat blocking effect. On the other hand, if the intermediate zone is too long, although the longer the more preferred, equipment should become large. Therefore, about 5 seconds is sufficient for the length.

5.1.4. Final Heat Treatment

After passed through the intermediate zone, the film is preferably subjected to a heat treatment at a temperature equal to or higher than the transverse drawing temperature and equal to or less than 180° C. in the final heat treatment zone. When the heat treatment temperature is not equal to or higher than the transverse drawing temperature, effect of the heat treatment is not exerted. In such a case, a shrinkage in hot water of 80° C. becomes higher than 15%, which is not preferred. The higher the heat treatment temperature is the lower the shrinkage of the film, however, the heat treatment temperature of more than 180° C. or more is not preferable because the film surface becomes rougher to diminish printing performance.

In the final heat treatment, it is possible to reduce a shrinkage in the width direction, by shortening a distance between the clips of the tenter at an arbitrary ratio (relaxation in the width direction). Thus, in the final heat treatment, it is preferred that relaxation in a range of 0% or more and 10% or less in the width direction be conducted (relaxation ratio 0% means that relaxation is not conducted). Although the higher a relaxation ratio in the width direction is, the more a shrinkage in the width direction lowers, an upper limit of the relaxation ratio (a shrinkage in the width direction of a film immediately after a transverse drawing) is determined depending on raw materials used, drawing conditions in the width direction, or heat treatment temperature, and relaxation cannot be carried out beyond the upper limit. In the polyester film of the present invention, an upper limit of the relaxation ratio in the width direction is 10%.

A time of passing through the final heat treatment zone is preferably 2 seconds or more and 20 seconds or less. If the passing time is 2 seconds or less, the film passes through the heat treatment zone without having a surface temperature reached a set temperature, which makes the heat treatment meaningless. The passing time is preferably 2 seconds or more, and more preferably 5 seconds or more, since the longer the passing time, the more the effect of the heat treatment is achieved. However, a longer passing time will result in an immense size of equipment, and 20 seconds or less is sufficient for a practical use.

After that, the film is wound, with both ends cut and removed, to thus obtain a white polyester film roll.

5.2. Adhesion Between Films

When the white polyester film of the present invention is produced, it is also possible to adhere the polyester film mentioned in the above 5.1 "Film forming by co-extrusion" to another polyester film. When an undrawn film is used as the heat sealing layer, it is preferably adhered to a polyester film drawn in at least one direction. As a method of adhesion, the method listed in the above 1. "Layer structure of white polyester film" may be used. In a case of dry lamination, it is possible to use a commercially available adhesive for dry lamination. Representative examples are Dick Dry (registered trademark) LX-703VL manufactured by DIC Corporation, KR-90 manufactured by DIC Corporation, TAKENATE (registered trademark) A-4 manufactured by Mitsui Chemicals, Inc., TAKELAC (registered trademark) A-905 manufactured by Mitsui Chemicals, Inc., etc.

EXAMPLES

Next, the present invention will be described more concretely by way of Examples and Comparative Examples. However, the present invention is by no means limited by modes of the Examples, and may appropriately be modified within a range not deviated from the gist of the present invention.

Evaluation methods of the film are as follows. Incidentally, in a case where a longitudinal direction and a width direction cannot immediately be identified for such a reason that an area of a film is small, the longitudinal direction and the width direction may provisionally be determined, since no problem is particularly caused even if the provisionally determined longitudinal direction and width direction are deviated by 90 degrees from correct directions.

<Evaluation Methods of Heat Sealing Layer>

[Mobile Amorphous Content]

Samples of the heat sealing layers of 10.0±0.2 mg were weighed and put into a hermetic aluminum pan, and reversing heat capacity curves thereof were obtained by using a temperature modulated differential scanning calorimeter (DSC) "Q100" (manufactured by TA Instruments) in MDSC (registered trademark) heat-only mode, at an average temperature raising speed of 2.0° C./min., and with a modulation period of 60 seconds.

When a sealant layer is obtained from a laminated film, in a case of co-extruded film, the surface in a side of heat sealing layer was shaved with a feather blade. A cross section of the shaved film sample was observed with an electron scanning microscope (SEM) to check any layer other than heat sealing layer was not shaved. In a case of the laminate film, a notch was made in the film, from which the film was torn by hand, and interlayer exfoliation in the torn portion (cut) was peeled off with tweezers. For the peeled off heat sealing layer, a portion 1 cm or more away from the cut was sampled.

In the heat capacity curve obtained by the measurement, an inflection point was determined by using an attached analysis software (TA Analysis, manufactured by TA Instruments), and as a difference in heat capacity between at a lower and a higher temperature than the inflection point (a glass transition point), a difference in reversing heat capacity×$\Delta Cp$ was determined according to the following Equation 1.

Difference in reversing heat capacity$\Delta Cp$=(Heat capacity $Cp1$ in high temperature side)−(Heat capacity $Cp2$ in low temperature side)    (Equation 1)

Here, in the heat capacity curve, an extension line of the base line of the heat capacity curve in the high temperature side relative to Tg was drawn, and an intersection point thereof with a tangent line of the inflection point (Tg) was determined. A value of Y axis corresponding to the intersection point (a reversing heat capacity) was read, and regarded as a heat capacity Cp1 in the high temperature side. An extension line of the base line of the heat capacity curve in the low temperature side relative to Tg was also drawn, and an intersection point thereof with a tangent line of the inflection point (Tg) was determined. A value of Y axis corresponding to the intersection point (a reversing heat capacity) was read, and regarded as a heat capacity Cp2 in the low temperature side.

<Evaluation Methods of Film>

[Heat Sealing Strength]

Heat sealing strength was measured in conformity with JIS Z1707. Specific procedure is briefly shown. Heat sealing layers of samples which have not been subjected to a coating treatment or a corona treatment are adhered to each other with a heat sealer. Sealing conditions were an upper bar temperature set at 160° C., a lower bar temperature set at 100° C., a pressure was set at 0.2 MPa, and a time was set at 2 seconds. Adhesion samples were cut out so as to have a seal width of 15 mm. Peeling strength was measured by using a universal tensile strength tester "DSS-100" (manufactured by Shimadzu Corporation) at a tensile speed of 200 mm/minute. The peeling strength is shown in strength per 15 mm (N/15 mm).

[Hot-Water Heat Shrinkage]

A film was cut into a square of 10 cm×10 cm, shrunk by being immersed in hot water of 80±0.5° C. for 10 seconds under a no load condition, then immersed in water of 25° C.±0.5° C. for 10 seconds, and taken out from the water. Thereafter, dimensions of the film in the lengthwise directions and transverse directions were measured, and a shrinkage in each directions was determined according to the following Equation 2. Incidentally, the measurement was conducted twice, and average thereof was determined.

Shrinkage={(Length before shrinkage−Length after shrinkage)/Length before shrinkage}×100(%)   (Equation 2)

[Total Light Transmittance]

Total light transmittance was measured in conformity with JIS-K-7136 using a haze meter (300A, manufactured by Nippon Denshoku Industries Co., Ltd.). The measurement was conducted twice, and average thereof was determined.

[Apparent Specific Gravity]

A film was cut into a square of 10 cm×10 cm, which was weighed with 4-digit accuracy using an automatic scale balance to determine the weight w (g), and which thickness was measured at ten spots using a micrometer to determine the average thickness t (μm); and then, an apparent specific gravity was calculated in accordance with the following Equation 3. The apparent specific gravity was rounded to two decimal places.

Apparent specific gravity(g/cm³)=w/(10 cm×10×t/10000)=w×100/t   (Equation 3)

[Appearance After Left in High Temperature Environment]

A film was cut into a square of 10 cm×10 cm, and then laminated with another biaxial drawing polyester film E5100-12 μm (manufactured by Toyobo Co., Ltd.) similarly cut into a square of 10 cm×10 cm, by using an adhesive for dry lamination (TAKELAC (registered trademark) A-950 manufactured by Mitsui Chemicals, Inc.). This laminate was put in a thermo-hygrostat (IG400 manufactured by Yamato Scientific Co., Ltd.) in which temperature and humidity were set at 80° C./65% RH, and left for 24 hours. After 24 hours, the laminate was taken out, and the shrinkage determined from the above equation 2 was calculated. In a case that the shrinkage varies depending on a direction of the film, a shrinkage of a direction which had a larger shrinkage was taken. This shrinkage was evaluated as follows as an appearance after left in a high-temperature environment.

| Judgment good | shrinkage ratio relative to the original shape was less than 2%. |
| Judgment fair | shrinkage ratio relative to the original shape was 2% or more and 5% or less. |
| Judgment poor | shrinkage ratio relative to the original shape was more than 5%. |

[Thickness Irregularity in Longitudinal Direction]

A film was sampled in a shape of roll of 11 m in the longitudinal direction×40 mm in the width direction, and the thickness was measured continuously along the longitudinal direction of the film (measured length was 10 m), by using a continuous contact-type thickness meter manufactured by Micron Measuring Instrument Co., Ltd, at a measuring speed of 5 m/min. The thickness irregularity in the longitudinal direction of the film was calculated from the following Equation 4, in which Tmax. is a maximum thickness, Tmin. is a minimum thickness, and Tave. is an average thickness at the time of measurement.

Thickness irregularity={(Tmax.−Tmin.)/Tave.}×100 (%)   (Equation 4)

[Thickness Irregularity in Width Direction]

A film was sampled in a shape of wide belt of 40 mm length×1.2 m width, and thickness was measured continuously along the width direction of the film sample (measured length was 1 m), by using a continuous contact-type thickness meter manufactured by Micron Measuring Instrument Co., Ltd, at a measuring speed of 5 m/min. Thickness irregularity in the width direction of the film was calculated from the above Equation 4, wherein Tmax. is a maximum thickness, Tmin. is a minimum thickness, and Tave. is an average thickness at the time of measurement.

[Tensile Breaking Strength]

A film sample in a rectangular shape of 140 mm in a direction to be measured and 20 mm in a direction perpendicular to the measurement direction was prepared in conformity with JIS K7113. A tensile test was conducted by using a universal tensile tester "DSS-100" (manufactured by Shimadzu Corporation), with holding each 20 mm of both ends of a test piece with chucks (100 mm distance between chucks), under conditions of an ambient temperature of 23° C. and a tensile speed of 200 mm/min., and a stress at the time of tensile failure was taken as tensile breaking strength (MPa). Measurement directions were longitudinal direction and width direction, in which test was conducted individually.

[Aroma Retainability]

Two pieces of films were cut into squares of 10 cm×10 cm, which were then laminated with each other, and formed into a bag, with only one side open, and three sides heat-sealed at 160° C. Each 20 g of limonene (manufactured by NACALAI TESQUE, INC.) and menthol (manufactured by NACALAI TESQUE, INC.) were put therein, and then the opening one side was also heat sealed to produce a sealed bag. The bag was put in a glass container with a capacity of 1000 ml, and a lid was put on the glass container. After one week, the lid of the glass container was opened so that persons (total 16 persons with 4 persons in twenties, 4 persons in thirties, 4 persons in forties and 4 persons in fifties; the ratio of men to women was 1:1 in each age category) could smell the air in the glass container. The air in the glass container was smelled, and evaluations were made as follows.

| | |
|---|---|
| Judgment good | the number of persons who sensed a smell 0 to 1 |
| Judgment fair | the number of persons who sensed a smell 2 to 3 |
| Judgment poor | the number of persons who sensed a smell 4 to 16 |

[Adsorptivity]

A film was cut into a square of 10 cm×10 cm, and weighed. Then, the film was soaked into a solution of 500 ml in a container which was prepared by adding ethanol to limonene (manufactured by NACALAI TESQUE, INC.) and menthol (manufactured by NACALAI TESQUE, INC.) so that concentration of each became 30%, and taken out a week later. The film taken out was pressed with a Bemcot to remove the solution, and dried for 1 day in a room of a temperature of 23° C. and humidity of 60% RH. After dried, the film was weighed, and a difference in film weight determined from the following Equation 5 was defined as an adsorbed amount.

Adsorbed amount=Film weight after immersion−Film weight before immersion  (Equation 5)

The adsorbed amount was judged as follows.

| | |
|---|---|
| Judgment good | 0 mg or more and 5 mg or less |
| Judgment fair | more than 5 mg and equal to or less than 10 mg |
| Judgment poor | more than 10 mg |

<Preparation of Polyester Raw Material>

Synthesis Example 1

A stainless steel autoclave equipped with a stirrer, a thermometer, and a partial reflux condenser was charged with 100 mol % of dimethyl terephthalate (DMT) as a dicarboxylic acid component, and 100 mol % of ethylene glycol (EG) as a polyalcohol component, such that the ethylene glycol became 2.2 times of the dimethyl terephthalate in molar ratio, and then a transesterification reaction was conducted by using 0.05 mol % (relative to the acid component) of zinc acetate as a transesterification catalyst, with distilling off generated methanol from the system. Thereafter, 0.225 mol % (relative to the acid component) of antimony trioxide was added as a polycondensation catalyst, and a polycondensation reaction was conducted at 280° C., under a condition of reduced pressure of 26.7 Pa, to obtain polyester (1) with intrinsic viscosity of 0.75 dl/g. This polyester (1) is a polyethylene terephthalate.

Synthesis Example 2

Polyesters (2) to (6) were obtained in the same procedure as the Synthesis Example 1, with changing the monomer. The compositions of each polyester are shown in Table 1. In Table 1, TPA is terephthalic acid, IPA is isophthalic acid, BD is 1,4-butanecliol, NPG is neopentyl glycol, CHDM is 1,4-cyclohexanecliemethanol, and DEG is cliethylene glycol. In the production of polyester (6), SiO2 (Sylysia 266 manufactured by Fuji Silysia Ltd.) was added as a lubricant in a ratio of 7,000 ppm relative to the polyester. Each polyester was appropriately formed into a chip. The intrinsic viscosities of each polyester was 2:0.78 dl/g, 3:0.73 dl/g, 4:0.73 dl/g, 5:0.80 dl/g, 6:0.75 dl/g, respectively.

TABLE 1

| polyester raw material | composition of polyester raw material (mol %) | | | | | | | additive amount of lubricant (ppm) |
|---|---|---|---|---|---|---|---|---|
| | dicarboxylic acid component | | diol component | | | | | |
| | TPA | IPA | EG | BD | NPG | CHDM | DEG | |
| 1 | 100 | 0 | 99 | 0 | 0 | 0 | 1 | 0 |
| 2 | 80 | 20 | 99 | 0 | 0 | 0 | 1 | 0 |
| 3 | 100 | 0 | 68 | 0 | 30 | 0 | 2 | 0 |
| 4 | 100 | 0 | 67 | 0 | 0 | 30 | 3 | 0 |
| 5 | 100 | 0 | 0 | 100 | 0 | 0 | 0 | 0 |
| 6 | 100 | 0 | 99 | 0 | 0 | 0 | 1 | 7000 |

The production method of each film is described below.

(Production of Polyester Film 1)

Polyester 3, polyester 5, and polyester 6 were mixed together at a mass ratio of 84:10:6, as raw materials of the heat sealing layer (layer A). Polyester 1, polyester 3, polyester 5, polypropylene (FS2011DG3, manufactured by Sumitomo Chemical Co., Ltd.), and titanium dioxide (TA-300, manufactured by Fuji Titanium Industry Co., Ltd.) were mixed together at a mass ratio of 10:60:10:10:10, as raw materials of the white layer (layer B).

Each of the raw materials of layer A and layer B were fed into discrete biaxial screw extruders, which were melted at 270° C. respectively, adhered by a feed block in the middle of the flow path, and discharged from a T die to be laminated in a sheet shape. The discharged laminated sheet was cooled on a chill roll with a surface temperature set at 30° C. to obtain an undrawn film having a laminated structure of layer A/layer B/layer A. The ratio of layer A to layer B, or layer A/layer B, was made to be 50/50 by controlling the discharged resin.

The undrawn film obtained by cooling and solidification was introduced to a lengthwise drawing machine in which a plural number of rolls were arranged continuously, preheated on a preheating roll until the film temperature reached 82° C., and then drawn 3.8 times. The film immediately after the lengthwise drawing was passed through a heating furnace set by a hot air heater at 100° C., and subjected to a 20% relax treatment in the longitudinal direction, by utilizing the difference in rotation speed between the rolls at an entrance and an exit of the heating furnace. Thereafter, the lengthwise drawing film was forcibly cooled by a cooling roll with a surface temperature set at 25° C. The film after the relax treatment was introduced to a transverse drawing machine (tenter), subjected to preheating of 5 seconds until the surface temperature reached 95° C., and then drawn 4.0 times in the width direction (the transverse direction). The film after the transverse drawing was directly introduced to the intermediate zone, through which the film was passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung in a substantially completely perpendicular direction.

After that, the film passed through the intermediate zone was introduced to the final heat treatment zone, and subjected to a heat treatment at 130° C. for 5 seconds. At this time, a relaxation treatment of 3% in the width direction was conducted, by narrowing a clip interval in the film width direction, simultaneously with the heat treatment. After passed through the final heat treatment zone, the film was cooled, and wound into a roll shape with both ends cut and removed, so as to have a width of 500 mm, to produce a biaxial drawn film with a thickness of 30 μm continuously over a prescribed length. The production conditions are shown in Table 2.

(Production of Polyester Film 2)

Polyester 3, polyester 5, and polyester 6 were mixed together at a mass ratio of 84:10:6, as raw materials of layer A. Polyester 1, polyester 3, polyester 5, polypropylene (FS2011DG3, manufactured by Sumitomo Chemical Co., Ltd.), and titanium dioxide (TA-300, manufactured by Fuji Titanium Industry Co., Ltd.) were mixed together at a mass ratio of 10:50:10:20:10, as raw materials of layer B.

Each of the raw materials of layer A and layer B were fed into discrete biaxial screw extruders, which were melted at 270° C. respectively, adhered by a feed block in the middle of the flow path, and discharged from a T die to be laminated in a sheet shape. The discharged laminated sheet was cooled on a chill roll with a surface temperature set at 30° C. to obtain an undrawn film having a laminated structure of layer A/layer B/layer A. The ratio layer A/layer B was made to be 30/70 by controlling the discharged resin.

Then, under the same conditions as polyester film 1, the film was formed into a biaxial drawn film with a width of 500 mm and a thickness of 30 μm. The production conditions are shown in Table 2.

(Production of Polyester Film 3)

The film was formed into a biaxial drawn film with a width of 500 mm and a thickness of 30 μm under the same conditions as polyester film 2 except that the discharged resin was controlled to make the film thickness 50 μm after biaxial drawing. The production conditions are shown in Table 2.

(Production of Polyester Film 4)

Polyester 1, polyester 3, polyester 5, and polyester 6 were mixed together at a mass ratio of 24:60:10:6, as raw materials of layer A. Polyester 1, polyester 3, polyester 5, polypropylene (FS2011DG3, manufactured by Sumitomo Chemical Co., Ltd.), and titanium dioxide (TA-300, manufactured by Fuji Titanium Industry Co., Ltd.) were mixed together at a mass ratio of 10:60:10:10:10, as raw materials of layer B.

Each of the raw material of layer A and layer B were fed into discrete biaxial screw extruders, which were melted at 270° C. respectively, adhered by a feed block in the middle of the flow path, and discharged from a T die to be laminated in a sheet shape. The discharged laminated sheet was cooled on a chill roll with a surface temperature set at 30° C. to obtain an undrawn film having a laminated structure of layer A/layer B/layer A. The ratio layer A/layer B, was made to be 50/50 by controlling the discharged resin.

The undrawn film obtained by cooling and solidification was introduced to a lengthwise drawing machine in which a plural number of rolls were arranged continuously, preheated on a preheating roll until the film temperature reached 90° C., and then drawn 3.8 times. Immediately after the lengthwise drawing the film was passed through a heating furnace set by a hot air heater at 110° C., and subjected to a 20% relax treatment in the longitudinal direction, by utilizing the difference in rotation speed between the rolls at an entrance and an exit of the heating furnace. Thereafter, the lengthwise drawn film was forcibly cooled by a cooling roll with a surface temperature set at 25° C. The film after the relax treatment was introduced to a transverse drawing machine (tenter), subjected to preheating of 5 seconds until the surface temperature reached 100° C., and then drawn 4.0 times in the width direction (the transverse direction). The film after the transverse drawing was directly introduced to the intermediate zone, through which the film was passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung down in a substantially completely perpendicular direction.

After that, the film that had passed through the intermediate zone was introduced to the final heat treatment zone, and subjected to a heat treatment at 130° C. for 5 seconds. At this time, a relaxation treatment of 3% in the width direction was conducted, by narrowing a clip interval in the film width direction, simultaneously with the heat treatment. The film, passed through the final heat treatment zone, was cooled, and wound into a roll shape with both ends cut and removed, so as to have a width of 500 mm, to produce a biaxial drawn film with a thickness of 30 μm continuously over a prescribed length. The production conditions are shown in Table 2.

(Production of Polyester Film 5)

Polyester 1, polyester 3, polyester 5, and polyester 6 were mixed together at a mass ratio of 24:60:10:6, as raw materials of layer A, which was fed into a biaxial screw extruders, melted at 270° C., and discharged from a T die into a sheet shape. The discharged sheet was cooled on a chill roll with a surface temperature set at 30° C. to obtain an undrawn film having a single layer structure of only layer A. The film was introduced to a transverse drawing machine (tenter), subjected to preheating of 5 seconds until the surface temperature reached 80° C., and then drawn 4.0 times in the width direction (the transverse direction). The film after the transverse drawing was directly introduced to the intermediate zone, through which the film passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung down in a substantially completely perpendicular direction.

After that, the film that had passed through the intermediate zone was introduced to the final heat treatment zone, and subjected to a heat treatment at 110° C. for 5 seconds. At this time, a relaxation treatment of 3% in the width direction was conducted, by narrowing a clip interval in the film width direction, simultaneously with the heat treatment. The film, passed through the final heat treatment zone, was cooled, and wound into a roll shape with both ends cut and removed, so as to have a width of 500 mm, to produce a uniaxial drawn film with a thickness of 15 μm continuously over a prescribed length. The production conditions are shown in Table 2.

(Production of Polyester Film 6)

Polyester 1, polyester 2, polyester 4, polyester 5, and polyester 6 were mixed together at a mass ratio of 5:86:2:2:5, as raw materials of layer A, which was fed into a biaxial screw extruders, melted at 270° C., and discharged from a T die into a sheet shape. The discharged sheet was cooled on a chill roll with a surface temperature set at 30° C. to obtain an undrawn film having a single layer structure of only layer A.

The undrawn film obtained by cooling and solidification was wound into a roll shape with both ends cut and removed, so as to hav a width of 500 mm, to produce an undrawn film with a thickness of 15 µm. The production conditions are shown in Table 2.

(Production of Polyester Film 7)

Polyester 1, polyester 5, polyester 6, polypropylene (FS2011DG3, manufactured by Sumitomo Chemical Co., Ltd.), and titanium dioxide (TA-300, manufactured by Fuji Titanium Industry Co., Ltd.) were mixed together at a mass ratio of 65:10:5:10:10, as raw materials of layer B, which was fed into a biaxial screw extruders, melted at 270° C., and discharged from a T die into a sheet shape. The discharged sheet was cooled on a chill roll with a surface temperature set at 30° C. to obtain an undrawn film having a single layer structure of only layer B.

The undrawn film obtained by cooling and solidification was introduced to a lengthwise drawing machine in which a plural number of rolls were arranged continuously, preheated on a preheating roll until the film temperature reached 95° C., and then drawn 3.8 times. The film immediately after the lengthwise drawing was passed through a heating furnace set by a hot air heater at 110° C., and subjected to a 20% relax treatment in the longitudinal direction, by utilizing the difference in rotation speed between the rolls at an entrance and an exit of the heating furnace. Thereafter, the lengthwise drawing film was forcibly cooled by a cooling roll with a surface temperature set at 25° C. The film after the relax treatment was introduced to a transverse drawing machine (tenter), subjected to preheating of 5 seconds until the surface temperature reached 100° C., and then drawn 4.0 times in the width direction (the transverse direction). The film after the transverse drawing was directly introduced to the intermediate zone, through which the film was passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung in a substantially completely perpendicular direction.

After that, the film passed through the intermediate zone was introduced to the final heat treatment zone, and subjected to a heat treatment at 130° C. for 5 seconds. At this time, a relaxation treatment of 3% in the width direction was conducted, by narrowing a clip interval in the film width direction, simultaneously with the heat treatment. After passing through the final heat treatment zone, the film was cooled, and wound into a roll shape with both ends cut and removed, so as to have a width of 500 mm, to produce a biaxial drawn film with a thickness of 15 µm continuously over a prescribed length. The production conditions are shown in Table 2.

(Production of Polyester Film 8)

Polyester 1 and polyester 6 were mixed together at a mass ratio of 94:6, as raw materials of layer A, which was fed into a biaxial screw extruders, melted at 270° C., and discharged from a T die into a sheet shape. The discharged sheet was cooled on a chill roll with a surface temperature set at 30° C. to obtain an undrawn film having a single layer structure of only layer A.

The undrawn film obtained by cooling and solidification was introduced to a lengthwise drawing machine in which a plural number of rolls were arranged continuously, preheated on a preheating roll until the film temperature reached 90° C., and then drawn 3.8 times. Without allowing it to pass through a heating furnace (without a relax treatment), the film immediately after the lengthwise drawing was forcibly cooled by a cooling roll with a surface temperature set at 25° C.

The film after the lengthwise drawing was introduced to a transverse drawing machine (tenter), subjected to preheating of 5 seconds until the surface temperature reached 100° C., and then drawn 4.0 times in the width direction (the transverse direction). The film after the transverse drawing was directly introduced to the intermediate zone, through which the film was passed in 1.0 second. In this connection, in the intermediate zone of the tenter, hot air from the final heat treatment zone and hot air from the transverse drawing zone were blocked, such that, when a rectangular shaped piece of paper was hung in the intermediate zone in a state where a film was not passed through, the piece of paper hung in a substantially completely perpendicular direction.

After that, the film passed through the intermediate zone was introduced to the final heat treatment zone, and subjected to a heat treatment at 200° C. for 5 seconds. At this time, a relaxation treatment of 3% in the width direction was conducted, by narrowing a clip interval in the film width direction, simultaneously with the heat treatment. After passing through the final heat treatment zone, the film was cooled, and wound into a roll shape with both ends cut and removed, so as to have a width of 500 mm, to produce a biaxial drawn film with a thickness of 15 µm continuously over a prescribed length. The production conditions are shown in Table 2.

TABLE 2

|  |  | film 1 | film 2 | film 3 | film 4 | film 5 | film 6 | film 7 | film 8 |
|---|---|---|---|---|---|---|---|---|---|
| Raw material composition | polyester 1 | 0 | 0 | 0 | 24 | 24 | 5 | — | 94 |
| of heat sealing layer | polyester 2 | 0 | 0 | 0 | 0 | 0 | 86 | — | 0 |
| (A layer) | polyester 3 | 84 | 84 | 84 | 60 | 60 | 0 | — | 0 |
| (mass %) | polyester 4 | 0 | 0 | 0 | 0 | 0 | 2 | — | 0 |
|  | polyester 5 | 10 | 10 | 10 | 10 | 10 | 2 | — | 0 |
|  | polyester 6 | 6 | 6 | 6 | 6 | 6 | 5 | — | 6 |
| Raw material composition | polyester 1 | 10 | 10 | 10 | 10 | — | — | 65 | — |
| of white layer (B layer) | polyester 2 | 0 | 0 | 0 | 0 | — | — | 0 | — |
| (mass %) | polyester 3 | 60 | 50 | 50 | 60 | — | — | 0 | — |
|  | polyester 4 | 0 | 0 | 0 | 0 | — | — | 0 | — |
|  | polyester 5 | 10 | 10 | 10 | 10 | — | — | 10 | — |
|  | polyester 6 | 0 | 0 | 0 | 0 | — | — | 5 | — |
|  | polypropylene | 10 | 20 | 20 | 0 | — | — | 10 | — |
|  | polystyrene | 0 | 0 | 0 | 10 | — | — | 0 | — |
|  | titanium dioxide | 10 | 10 | 10 | 10 | — | — | 10 | — |

TABLE 2-continued

|  |  | film 1 | film 2 | film 3 | film 4 | film 5 | film 6 | film 7 | film 8 |
|---|---|---|---|---|---|---|---|---|---|
| Layer structure | | A/B/A | A/B/A | A/B/A | A/B/A | A | A | B | A |
| Thickness ratio of layer (layer A (%)/layer B (%)) | | 50/50 | 30/70 | 30/70 | 50/50 | 100/0 | 100/0 | 0/100 | 100/0 |
| Amorphous component amount of layer A (mol %) | | 25.3 | 25.3 | 25.3 | 17.8 | 17.8 | 18 | 0 | 18 |
| Lengthwise drawing | drawing temperature (° C.) | 82 | 82 | 82 | 90 | — | — | 95 | 90 |
| | drawing ratio | 3.8 | 3.8 | 3.8 | 3.8 | — | — | 3.8 | 3.8 |
| Relaxation treatment in the longitudinal direction | heating furnace temperature (° C.) | 100 | 100 | 100 | 110 | — | — | 110 | — |
| | relaxation ratio (%) | 20 | 20 | 20 | 20 | — | — | 20 | — |
| Transverse drawing | drawing temperature (° C.) | 95 | 95 | 95 | 100 | 80 | — | 100 | 100 |
| | drawing ratio | 4.0 | 4.0 | 4.0 | 4.0 | 4.0 | — | 4.0 | 4.0 |
| Final heat treatment | temperature (° C.) | 130 | 130 | 130 | 130 | 110 | — | 130 | 200 |
| | relaxation ratio in the width direction (%) | 3 | 3 | 3 | 3 | 3 | — | 3 | 3 |
| Film thickness (μm) | | 30 | 30 | 50 | 30 | 15 | 15 | 15 | 15 |

[Evaluation of Film]

Examples 1 to 4

In Examples 1 to 4, polyester films 1 to 4 without any change were used respectively. In each film, layer A was the heat sealing layer, and layer B was the white layer.

Examples 5 to 8

In Examples 5 to 8, the heat sealing layer and the white layer were laminated to produce a film for evaluation. The two films were adhered to each other with an adhesive for dry lamination (TAKELAC, registered trademark: A-950, manufactured by Mitsui Chemicals, Inc.). The combination of the laminated films and the evaluation thereof are shown in Table 3.

Comparative Examples 1 to 4

In Comparative Examples 1 to 4, the heat sealing layer and the white layer were laminated in the same way as Examples 5 to 8. Note, however, that Comparative Example 4 used a polypropylene-based sealant (P1128-20 μm, manufactured by Toyobo Co., Ltd.) as the heat sealing layer. The combination of the laminate films and the evaluation thereof are shown in Table 3. When sealing strength of Comparative Example 4 was evaluated, the sealing temperature was set at 140° C. because the sealing temperature of 160° C. caused the film to fuse and adhere to a seal bar. In addition, when a bag was formed to evaluate adsorptivity and aroma retainability of limonene and menthol, the sealing temperature was set at 140° C. only in comparative Example 4.

TABLE 3

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Layer structure | heat sealing layer | film 1(A) | film 2(A) | film 3(A) | film 4(A) | film 5 | film 6 | film 5 | film 8 | film 8 | P1128-20 μm |
| | white layer | film 1(B) | film 2(B) | film 3(B) | film 4(B) | film 7 | film 7 | film 5 | film 7 | film 8 | film 7 |
| Total thickness (μm) | | 30 | 30 | 50 | 30 | 30 | 30 | 30 | 30 | 30 | 35 |
| Difference in reversing heat capacity of sealant layer $\Delta C_p$ (J/g · K) | | 0.25 | 0.25 | 0.25 | 0.19 | 0.23 | 0.33 | 0.23 | 0.13 | 0.13 | — |
| Heat sealing strength at 160° C. (N/15 mm) | | 14.3 | 9.5 | 15.1 | 5.8 | 14.6 | 22.3 | 13.5 | 0.3 | 0.5 | 8.6※ |
| Hot-water shrinkage (%) 80° C. | Lengthwise direction | 4.2 | 2.7 | 3.7 | 4.7 | −1.7 | 1.8 | −2.3 | 1.5 | 1.1 | 0.8 |
| | Transverse direction | 9.1 | 8.1 | 9.2 | 8.7 | 9.4 | 0.8 | 14.6 | 1.2 | 0.7 | 0.6 |
| Total Light Transmittance (%) | | 38.2 | 26.6 | 21.3 | 24.8 | 25.6 | 25.3 | 90.5 | 26.8 | 90.8 | 24.2 |
| Specific Gravity (g/cm3) | | 1.13 | 0.92 | 0.94 | 1.10 | 1.18 | 1.21 | 1.33 | 1.20 | 1.39 | 1.00 |
| Thickness irregularity (%) | Lengthwise direction | 13.8 | 14.7 | 15.1 | 14.3 | 13.4 | 13.2 | 8.8 | 11.3 | 9.4 | 10.1 |
| | Transverse direction | 15.5 | 17.1 | 17.8 | 16.8 | 15.6 | 12.1 | 14.6 | 14.9 | 8.6 | 11.3 |
| Appearance after left in high temperature environment | | good | good | good | good | good | good | poor | good | good | good |
| Aroma retainability | menthol | good | good | good | good | good | good | good | good | good | fair※ |
| | limonene | good | good | good | good | good | good | good | good | good | fair※ |
| Adsorptivity | menthol | good | good | good | good | good | good | good | good | good | poor※ |
| | limonene | good | good | good | good | good | good | good | good | good | poor※ |

※In Comparative Example 4, heat sealing strength of P1128-20 μm was measured at 140° C., and a bag for evaluation of aroma retainability and adsorptivity was formed at sealing temperature of 140° C.

[Evaluation Results of Films]

Figure 1:
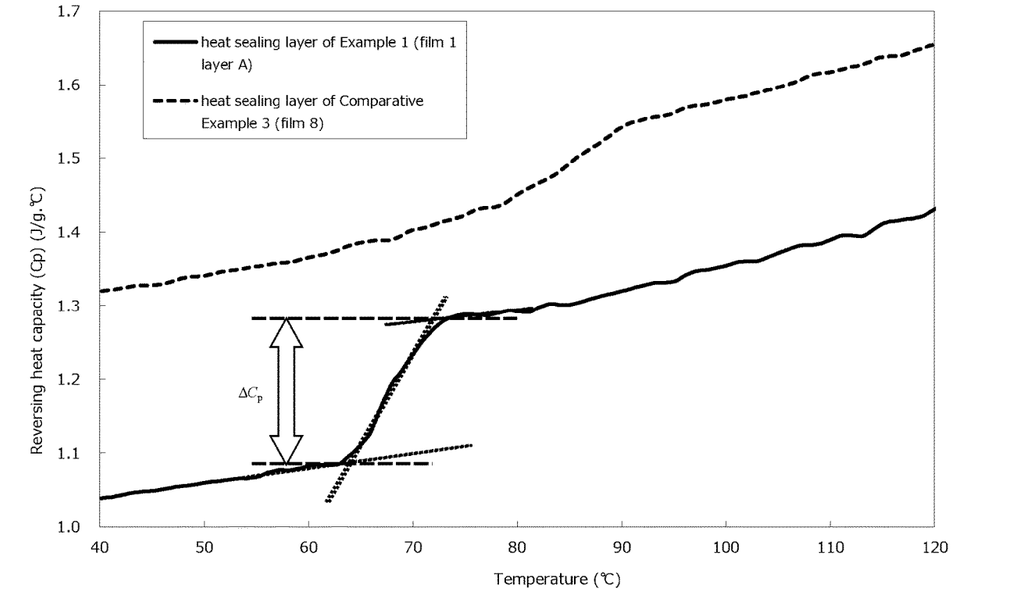
The FIGURE shows reversing heat capacity curves of the heat sealing layer (film 1) of Example 1 and the heat sealing layer (film 8) of Comparative Example 3, as measured by a temperature modulated DSC.

According to Table 3, good evaluation results were obtained in any of the films of Examples 1 to 6, with a difference in reversing heat capacity ΔCp of the heat sealing layer in a prescribed range, and excellent heat sealing strength, shrinkage, light transmittance, apparent specific gravity, thickness irregularity, appearance after left in a high-temperature environment, aroma retainability, and adsorptivity. Incidentally, the chart in FIG. 1 shows no disturbance, and the base line shifts in the vicinity of Tg, which confirms that the DSC measurement was performed properly.

On the other hand, as for the film of Comparative Example 1, although the ΔCp of the heat sealing layer was satisfied, and heat sealing strength, thickness irregularity, tensile breaking strength, aroma retainability, and an adsorptive property were excellent, however, evaluation on appearance after left in high temperature environment was low due to a high shrinkage. Furthermore, the film of Comparative Example 1 had high total light transmittance and large apparent specific gravity.

As for the film of Comparative Example 2, although the ΔCp of the heat sealing layer was also satisfied, and heat sealing strength, shrinkage, thickness irregularity, aroma retainability, and the adsorptivity were also excellent, a requirement of the present invention was not satisfied for having high total light transmittance.

The film of Comparative Example 3 marked heat sealing strength of zero, for having been peeled off immediately after heat sealed, due to a low ΔCp of the heat sealing layer.

The film of Comparative Example 4 was excellent in heat sealing strength, however, adsorptivity of limonene and menthol was poor and aroma retainability was fair.

INDUSTRIAL APPLICABILITY

The white polyester film of the present invention, which not only exhibits high heat sealing strength but also is less liable to adsorb various organic compounds, is capable of packaging oily and aromatic articles such as chemical products, medicinal products, and food products, and suitable for use as a sealant. At least one layer including the polyester film of the present invention is also capable of being laminated with another film, and it is also possible to provide a packaging bag including such a laminate.

The invention claimed is:

1. A white polyester film which is formed with a polyester resin whose main constituent is ethylene terephthalate, and satisfies the following requirements (1) to (6):
   (1) the film consists of either (a) two layers: a white layer and a heat sealing layer or (b) three layers: a heat sealing layer/a white layer/a heat sealing layer, wherein at least one of the film surfaces is the heat sealing layer, and the white layer comprises a thermoplastic resin immiscible with the polyester;
   (2) the film has a peeling strength of 4 N/15 mm or more and 25 N/15 mm or less when the heat sealing layers of two identical polyester films are heat-sealed to each other at 160° C. and 0.2 MPa for 2 seconds;
   (3) the heat sealing layer of the polyester film has a difference in reversing heat capacity of 0.18 J/g·K or more and 0.35 J/g·K or less, and wherein the difference in reversing heat capacity is measured between at a lower and a higher temperature than a glass transition temperature with a temperature modulated DSC;
   (4) the film has a heat shrinkage of −10% or more and 10% or less both in a longitudinal direction and in a width direction when treated in hot water at 80° C. for 10 seconds;
   (5) the film has a total light transmittance of 20% or more and 40% or less; and
   (6) the film has an apparent specific gravity of 0.90 or more and 1.30 or less.

2. The white polyester film according to claim 1, wherein a polyester component constituting the polyester film is formed from at least one selected from the group consisting of neopentyl glycol, 1,4-cyclohexanedimethanol, isophthalic acid, and diethylene glycol.

3. The white polyester film according to claim 2, wherein the polyester component constituting the polyester film is formed from 1,4-butanediol.

4. The white polyester film according to claim 3, wherein the film has a thickness of 5 to 200 μm.

5. The white polyester film according to claim 1, wherein a polyester component constituting the polyester film is formed from 1,4-butanediol.

6. The white polyester film according to claim 5, wherein the film has a thickness of 5 to 200 μm.

7. The white polyester film according to claim 1, wherein the film has a thickness of 5 to 200 μm.

8. A packaging bag including at least one of the white polyester film according to claim 1.

9. A packaging bag including at least one of the white polyester film according to claim 3.

10. A packaging bag including at least one of the white polyester film according to claim 4.

11. A laminate comprising at least one layer of the white polyester film according to claim 1.

12. A laminate comprising at least one layer of the white polyester film according to claim 3.

13. A laminate comprising at least one layer of the white polyester film according to claim 4.

14. A packaging bag including at least one of the laminate according to claim 11.

15. A packaging bag including at least one of the laminate according to claim 12.

16. A packaging bag including at least one of the laminate according to claim 13.

17. The white polyester film according to claim 1, wherein the thermoplastic resin is formed from at least one resin selected from the group of a polystyrene-based resin, a polyolefin-based resin, a polyacrylic-based resin, a polycarbonate-based resin, a polysulfone-based resin, and a cellulose-based resin.

* * * * *